(12) United States Patent
Kurai et al.

(10) Patent No.: US 10,710,532 B2
(45) Date of Patent: Jul. 14, 2020

(54) ENERGY ABSORPTION STRUCTURE

(71) Applicant: Nissan Motor Co., Ltd., Yokohama-shi, Kanagawa (JP)

(72) Inventors: Shohei Kurai, Kanagawa (JP); Yukihiro Hamada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/093,159

(22) PCT Filed: Apr. 15, 2016

(86) PCT No.: PCT/JP2016/062095
§ 371 (c)(1),
(2) Date: Oct. 12, 2018

(87) PCT Pub. No.: WO2017/179187
PCT Pub. Date: Oct. 19, 2017

(65) Prior Publication Data
US 2019/0135210 A1    May 9, 2019

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01)

(58) Field of Classification Search
CPC .......... B60R 19/03; B60R 19/34; B60R 19/18
USPC ............ 293/133; 296/187.09, 187.1, 187.11; 188/371, 375–377
See application file for complete search history.

(56) References Cited

U.S. PATENT DOCUMENTS

| | | | |
|---|---|---|---|
| 5,914,163 A * | 6/1999 | Browne | B32B 5/28 428/36.1 |
| 6,601,886 B1 | 8/2003 | Thayer | |
| 9,260,070 B2 * | 2/2016 | Borger | B29C 45/14467 |

FOREIGN PATENT DOCUMENTS

| | | |
|---|---|---|
| EP | 2896535 B1 | 1/2018 |
| JP | 5-332386 A | 12/1993 |
| JP | 2005-247096 A | 9/2005 |
| JP | 4440683 B2 | 1/2010 |
| JP | 2015-85788 A | 5/2015 |
| WO | 2014/042211 A1 | 3/2014 |

* cited by examiner

*Primary Examiner* — Dennis H Pedder
(74) *Attorney, Agent, or Firm* — Global IP Counselors, LLP (57) ABSTRACT

An energy absorption structure has a frame member of a vehicle body framework, an energy absorption member formed from fiber-reinforced resin and a load-receiving member. The energy absorption member is provided at an end of the frame member in the front-rear direction of the vehicle body. The load-receiving member is provided on the energy-absorbing member on a side opposite to the frame member. A tearing element is provided adjacent an end portion of the energy-absorbing member corresponding to at least one of the load-receiving member and the frame member. The tearing element tears the energy-absorbing member due to an impact load that is inputted from the load-receiving member toward the energy-absorbing member, thereby severing the reinforcing fibers.

8 Claims, 9 Drawing Sheets

ENERGY ABSORPTION STRUCTURE

CROSS-REFERENCE TO RELATED APPLICATIONS

This application is a U.S. national stage application of International Application No. PCT/JP2016/062095, filed on Apr. 15, 2016.

BACKGROUND

Field of the Invention

The present invention relates to an energy-absorbing structure that uses an energy-absorbing member made of fiber-reinforced resin.

BACKGROUND INFORMATION

Japanese Patent No. 4440683 (Patent Document 1) discloses an energy-absorbing member made of fiber-reinforced resin that is used in a front side member of the front frame structure of a vehicle body. At the time of a front-end collision of a vehicle the collision load acts on the energy-absorbing member, and the collision energy is absorbed by the crushing of the energy-absorbing member.

SUMMARY

An energy-absorbing member made of fiber-reinforced resin absorbs collision energy by means of the deformation of a matrix resin with impregnated reinforcing fibers at the time that the energy-absorbing member is crushed. However, since the reinforcing fibers themselves do not readily rupture, the energy absorption efficiency can be further enhanced by causing the reinforcing fibers to rupture.

Therefore, an object of the present invention is to further increase the energy absorption efficiency of an energy-absorbing member made of a fiber-reinforced resin.

In the present invention a tearing element, which tears the energy-absorbing member when a collision load is input from a load-receiving member onto the energy-absorbing member, is provided adjacent the end portion of the energy-absorbing member that corresponds to at least one of the load-receiving member and a frame member.

According to the present invention, when the energy-absorbing member receives an impact load that is input onto the load-receiving member, the tearing element tears the energy-absorbing member. At this time, since the reinforcing fibers that extend in a direction that intersects the input direction of the impact load are severed, the energy absorption efficiency is further enhanced.

DETAILED DESCRIPTION OF THE EMBODIMENTS

Embodiments for implementing the present invention are described in detail below with reference to the drawings.

Figure 1:
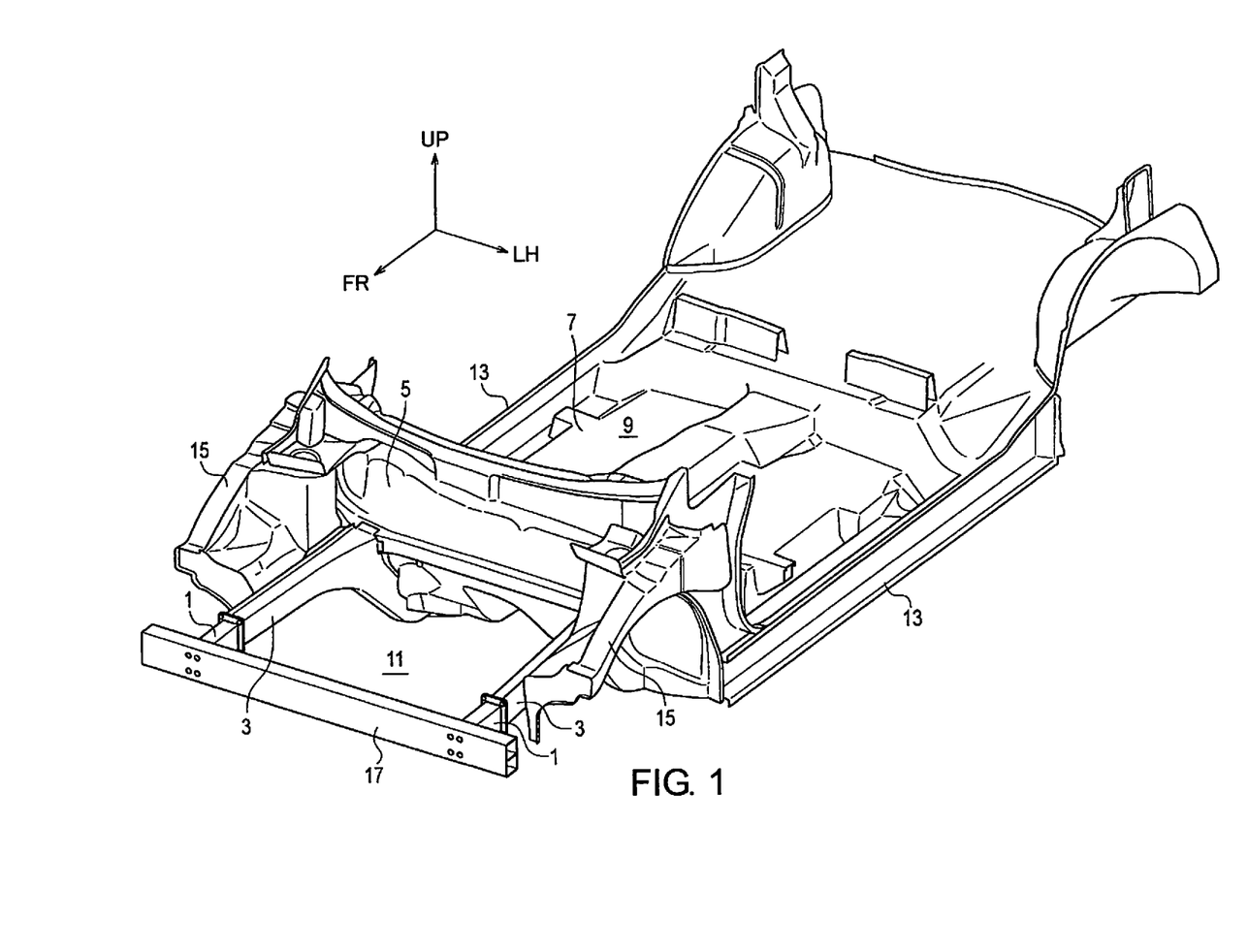
FIG. 1 is a perspective view of a lower portion of a vehicle body provided with an energy-absorbing structure according to a first embodiment.

FIG. 1 illustrates the lower portion of a vehicle body equipped with energy-absorbing members 1 according to a first embodiment of the present invention. The energy-absorbing members 1 are a fiber-reinforced resin material formed by impregnating reinforcing fibers, for example carbon fibers, in a matrix resin that is a resin for impregnation. In the drawings, the direction indicated by the arrow FR is the front of the vehicle body, the direction indicated by the arrow LH is the left side of the vehicle body, and the direction indicated by the arrow UP is the up direction of the vehicle body.

In the automobile vehicle body shown in FIG. 1, a pair of left and right front side members 3 are disposed on both sides of the front of the vehicle body in the vehicle width direction, along the longitudinal direction of the vehicle body. The front side members 3 each constitutes a frame member that forms the frame of the vehicle body and bends downward adjacent the location corresponding to the dash panel 5 and is joined to the lower surface of the floor panel 7. The dash panel 5 separates the vehicle cabin 9 and the engine compartment 11. Side sills 13 are disposed on both sides of the floor panel 7 in the vehicle width direction along the longitudinal direction of the vehicle body, and a hood ledge panels 15 are disposed on the upper portion of the front side members 3 on the engine compartment side.

The energy-absorbing members 1 are attached to the front-end portion of the front side members 3. A bumper reinforcement 17 is attached to the front-end portion of the energy-absorbing member 1 on the opposite side of the front side members 3. The bumper reinforcement 17 is disposed along the vehicle width direction, and both ends thereof project farther outwardly in the vehicle width direction than the energy-absorbing member 1. A bumper fascia, not shown, is attached to the bumper reinforcement 17.

Figure 2:
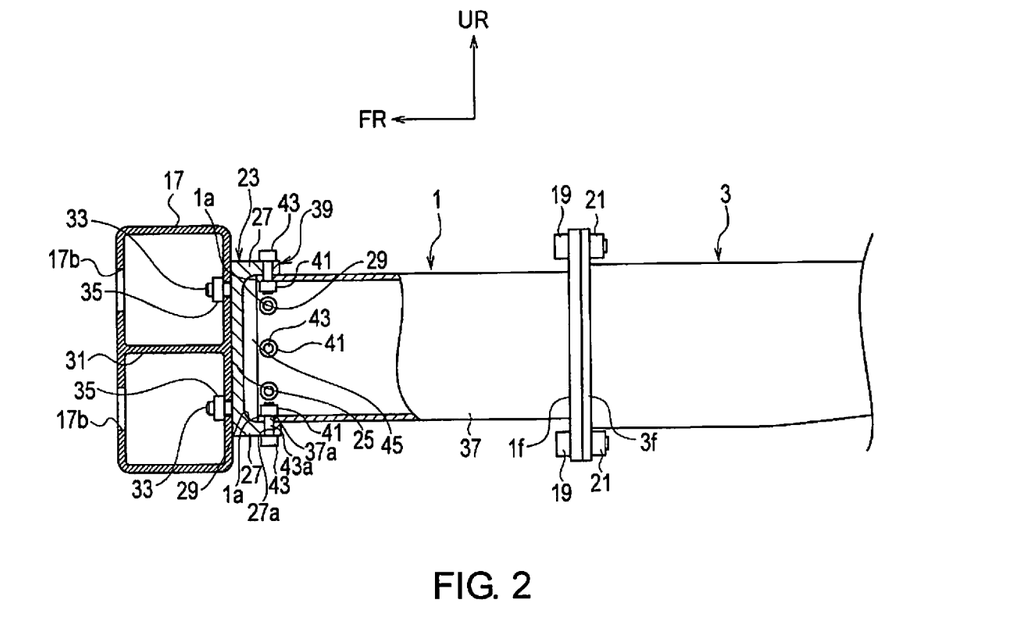
FIG. 2 is a side view of a front portion of the vehicle body with the energy-absorbing structure of FIG. 1 shown in partial cross section.

The front side members 3 are formed in the shape of a quadrangular prism, and includes a front-end flange 3f at the front-end portion on the energy-absorbing member 1 side, as illustrated in FIG. 2. A rear-end flange 1f is provided on the rear-end portion of the energy-absorbing member 1 on the side with the front side members 3. The front side members 3 and the energy-absorbing members 1 are fixed by causing the front-end flange 3f and the rear-end flange 1f to abut against each other and fastening them with a plurality of nuts 21 and a plurality of bolts 19.

Figure 3:
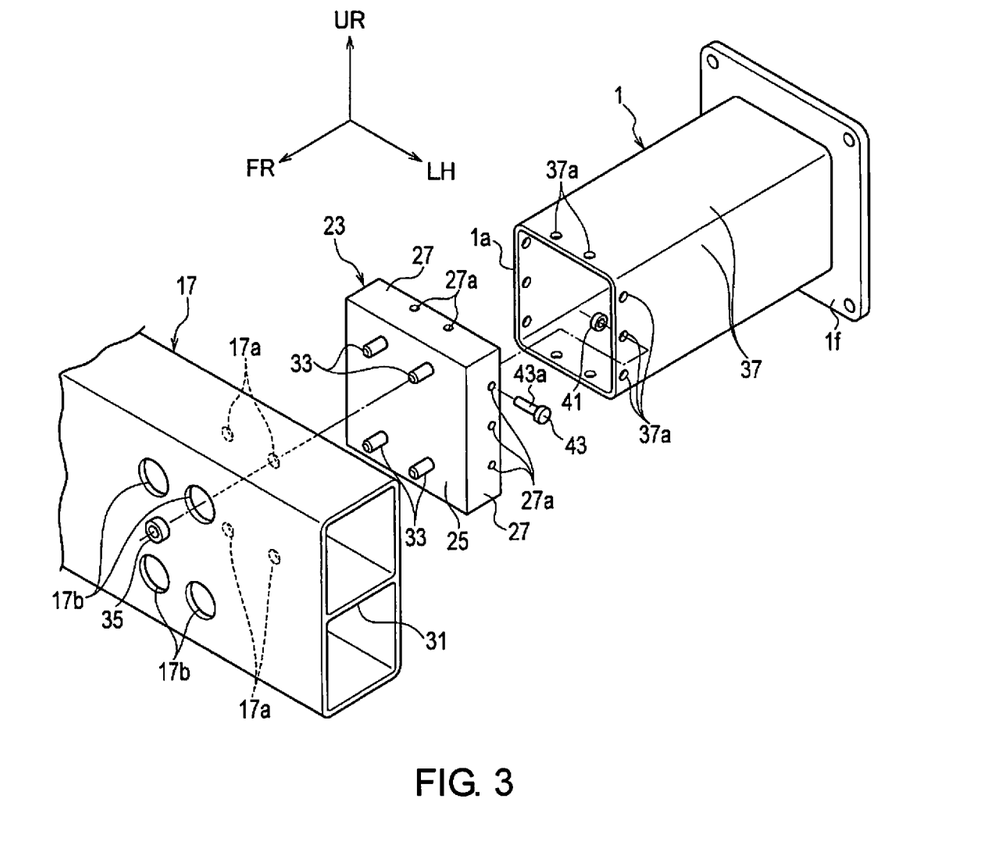
FIG. 3 is an exploded perspective view of the periphery of the energy-absorbing structure of FIG. 1.

The energy-absorbing members 1 and the bumper reinforcement 17 are fixed via connecting members 23, as illustrated in FIGS. 2 and 3. The bumper reinforcement 17 constitutes a load-receiving member. The energy-absorbing members 1 each have the shape of a quadrangular prism tube, in the same manner as the front side members 3, as illustrated in FIG. 3. On the other hand, the connecting members 23 have a quadrangular shape that is larger than the energy-absorbing members 1 in a front view as seen from the front of the vehicle body.

The connecting members 23 include an end surface portion 25 that abuts the rear surface of the bumper reinforcement 17, and side wall portions 27 that are bent from the four peripheral edges of the end surface portion 25 and that project toward the energy-absorbing member 1. The inner side of the bent portion between the end surface portion 25 and the side wall portions 27 forms a concave curved surface portion 29 over the entire perimeter, as illustrated in FIG. 2.

The bumper reinforcement 17 is a hollow member whose cross-sectional shape is long vertically and has a partition wall 31 in the center in the vertical direction, and spaces having a cross section that is essentially square are formed above and below the partition wall 31. Four through-holes 17a are provided on the rear surface of the bumper reinforcement 17, and stud bolts 33 are provided on the end surface portion 25 of the connecting members 23 corresponding to the through-holes 17a. The bumper reinforcement 17 and the connecting members 23 are fixed and integrated by inserting the stud bolts 33 into the through-holes 17a, and fastening nuts 35 to the stud bolts 33 by utilizing working holes 17b on the front surface.

When the connecting members 23 are fastened to the energy-absorbing members 1, the four side wall portions 27 in the periphery of the connecting members 23 are attached, so as to cover the peripheral edges of the front-end portion of the energy-absorbing members 1 from the outside. At that time, the side-wall portions 27 of the connecting members 23 overlap the side surfaces 37 as the surface portions of the energy-absorbing members 1 from the outer side adjacent the front-end portion to form overlapping portions 39, as illustrated in FIG. 2. In the overlapping portions 39, the side-wall portions 27 of the connecting members 23 and the side surfaces 37 of the energy-absorbing members 1 overlap in an orthogonal direction that intersects the input direction of the impact load, which is described below.

A plurality of bolt insertion holes 37a are formed that extend through the side surfaces 37 of the energy-absorbing members 1 in the overlapping portions 39, and nuts 41 are attached on the inner sides of the side surfaces 37 in the periphery of the bolt insertion holes 37a. Bolt insertion holes 27a are formed that pass through the side wall portions 27 of the connecting members 23 corresponding to the bolt insertion holes 37a.

The connecting members 23 and the energy-absorbing members 1 are fixed by inserting bolts 43 as fasteners into the bolt insertion holes 27a, 37a and fastening the bolts to the nuts 41, as illustrated in FIG. 2. The bolt insertion holes 27a, 37a constitute mounting holes, which extend through in the overlapping direction of the overlapping portions 39.

In a state in which the connecting members 23 and the energy-absorbing members 1 are fixed, a gap is formed between peripheral front ends 1a of the energy-absorbing members 1 and the end surface portions 25 of the connecting members 23, as illustrated in FIG. 2. At that time, the curved surface portions 29 of the connecting members 23 are positioned in front of the peripheral front ends 1a of the energy-absorbing members 1, and the peripheral front ends 1a and the curved surface portions 29 face each other. The curved surface portions 29 each have a cross section in the form of a quarter arc of a circle. The outer surfaces of the side surfaces 37 of the energy-absorbing members 1 are essentially positioned on a line tangent to the end portion of the arc.

Described next is the impact absorption function of when a vehicle provided with the energy-absorbing structure described above undergoes a front-end collision.

The impact load that is received by the bumper reinforcement 17 when the automobile undergoes a front-end collision is transmitted to the energy-absorbing members 1 via the connecting members 23. At this time, the energy-absorbing members 1 are crushed and deformed between the bumper reinforcement 17 and the front side members 3, thereby absorbing the impact. When the energy-absorbing members 1 are crushed and deformed, the impact load is applied to the energy-absorbing members 1 via the fastening portion configured by the bolts 43 of the overlapping portions 39.

The shaft portions 43a of the bolts 43 are inserted into the bolt insertion holes 27a, 37a. Thus, the shaft portions 43a of the bolts 43 concentrate the stress in the bolt insertion holes 37a with respect to the energy-absorbing members 1 and becomes the point of origin when the energy-absorbing members 1 is crushed. The bolts 43 are provided in two or three locations on one side surface 37 of the energy-absorbing members 1.

Figure 4:
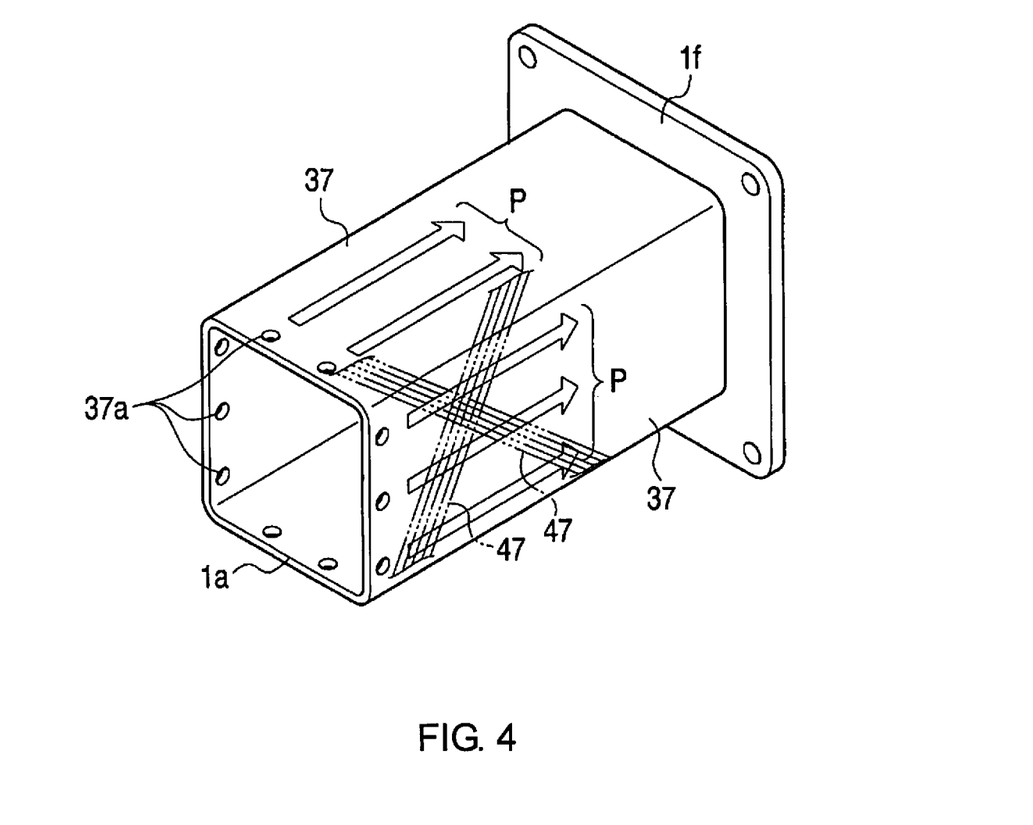
FIG. 4 is a perspective view of an energy-absorbing member in the energy-absorbing structure of FIG. 3.

Thus, the impact load that is concentrated at and imparted to the bolt insertion holes 37a, as illustrated in FIG. 4, reaches the side surfaces 37 of the energy-absorbing members 1 for each of the plurality of the bolt insertion holes 37a, as indicated by the arrows P. The energy-absorbing members 1 are crushed and torn into multiple pieces along the load input direction with the bolt insertion holes 37a as the points of origin, due to the impact load that is imparted to each of the plurality of the bolt insertion holes 37a. That is, the bolts 43 are provided adjacent the end portion of the energy-absorbing members 1 and function as a tearing element that tears the energy-absorbing members 1 along the load input direction.

Figure 5:
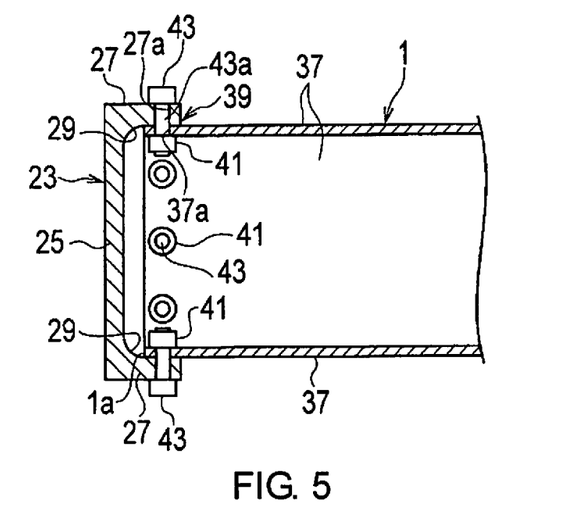
FIG. 5 is a cross-sectional view illustrating a state in which the energy-absorbing member in the energy-absorbing structure of FIG. 2 is connected to a connecting member.
Figure 6:
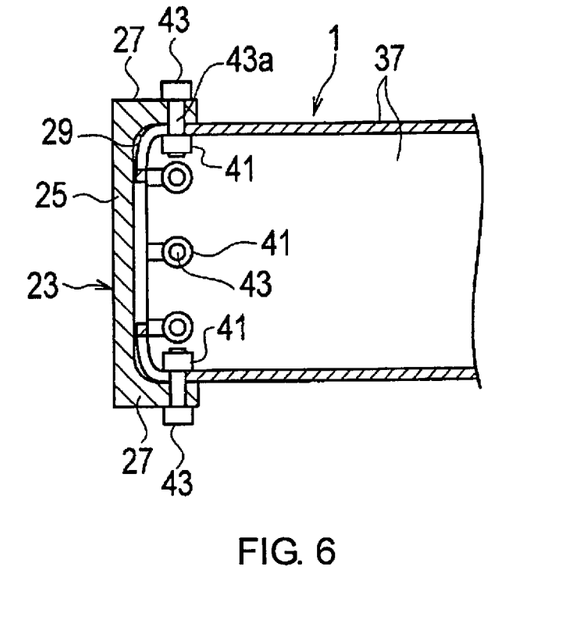
FIG. 6 is an operation explanatory view illustrating an initial state in which the energy-absorbing member is crushed and deformed with respect to FIG. 5.

When the energy-absorbing members 1 are crushed, the connecting members 23 moves in the direction toward the front side members 3 and transitions from the state before the impact load is received shown in FIG. 5 to the state shown in FIG. 6, so as to crush the energy-absorbing members 1. At this time, the energy-absorbing members 1 absorb the impact by the inward displacement of the peripheral front ends 1a while being guided by the curved surface portions 29 of the connecting members 23 over the entire perimeter. In FIGS. 5 and 6, stud bolts 33 that are similar to those of the connecting members 23 in FIG. 3 are omitted.

Figure 11:
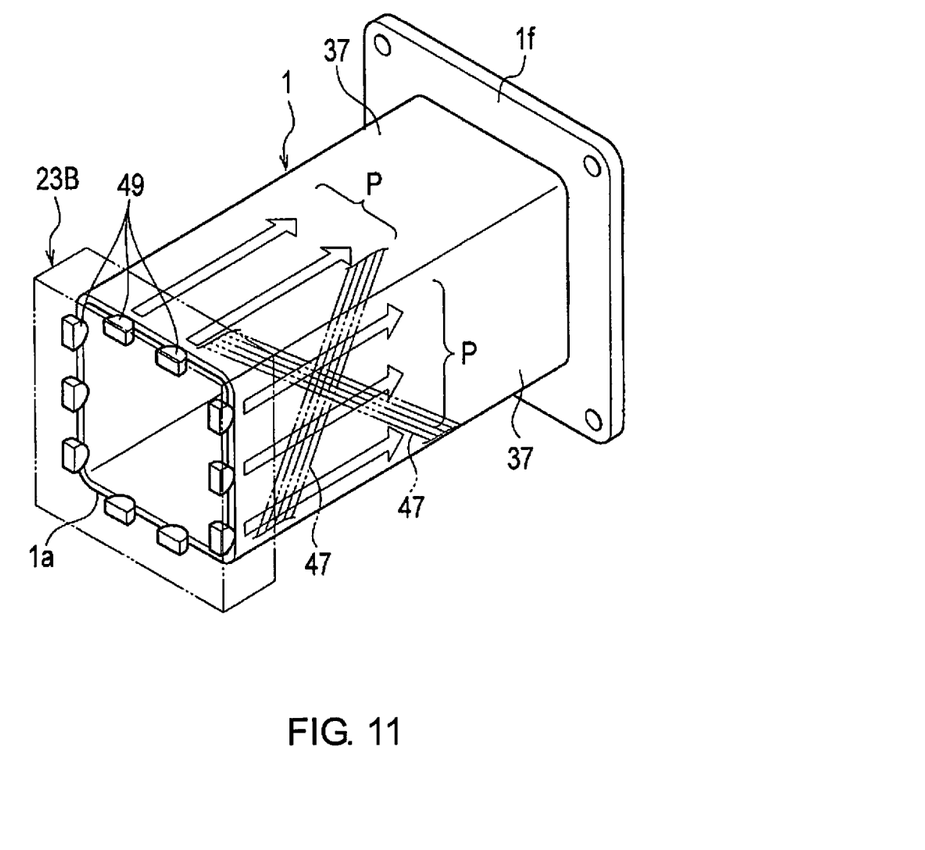
FIG. 11 is a perspective view of the energy-absorbing member and the connecting member according to the third embodiment.

In the energy-absorbing members 1, reinforcing fibers 47 indicated by the chain double-dashed lines are arranged so as to extend in a direction that intersects the load input direction, which is essentially the same direction as that indicated by the arrows P, at, for example, an approximately 45° angle, as illustrated in FIG. 4. In this case, when the energy-absorbing member 1 is torn by the bolts 43 and absorbs the impact load, the reinforcing fibers 47 are also severed, thereby absorbing the impact load. As a result, the energy absorption efficiency of the energy-absorbing members 1 is increased. In FIG. 4 and FIG. 11, which is described below, only a portion of the reinforcing fibers 47 is shown, but in fact, the reinforcing fibers 47 are provided over the entirety of the energy-absorbing members 1.

In the present embodiment, a tearing element that tears the energy-absorbing member 1 is composed of the bolts 43 that fasten and fix the energy-absorbing member 1 and the connecting member 23 on the side of the bumper reinforcement 17. Thus, it is not necessary to separately provide a tearing element, and it is possible to simplify the structure.

In the present embodiment, the energy-absorbing members 1 have a tubular form, and the side wall portions 27 of the connecting members 23 are attached so as to cover the outer perimeter sides of the tubular energy-absorbing members 1 to form the overlapping portion 39. In this case as illustrated in FIG. 6, the energy-absorbing members 1 are crushed essentially uniformly over the entire perimeter between the connecting members 23 and the energy-absorbing members, by being displaced inwardly so as to be enveloped by the side wall portions 27 from the outside at the time of collapse, further enhancing the energy absorption efficiency. In addition, it is possible to prevent scattering to the outside by the inward displacement and crushing of the energy-absorbing members 1.

At this time, the inner side of the bent portion between the end surface portions 25 and the side wall portions 27 of the connecting members 23 forms a concave curved surface portions 29. Thus, the energy-absorbing members 1 absorb the impact load more efficiently by the peripheral front ends 1a being smoothly displaced inwardly while being guided by the curved surface portions 29 of the connecting members 23.

In the present embodiment the energy-absorbing members 1 have a prismatic tubular shape, and the bolts 43 that constitute the tearing element are provided at corresponding positions on the side surfaces 37 of the energy-absorbing members 1 formed in a prismatic tubular shape. As a result, stress can be concentrated not only at the corners of the prismatic tube where stress tends to concentrate but also on the side surfaces 37, which are surface portions, thereby tearing and crushing not only the corners but also the side surfaces 37. As a result, the tubular energy-absorbing members 1 are crushed essentially uniformly over the entire perimeter, and the energy absorption efficiency becomes extremely high.

Figure 7:
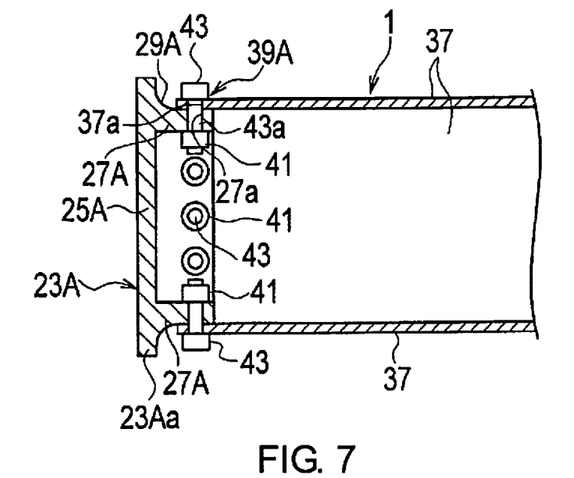
FIG. 7 is a cross-sectional view, corresponding to FIG. 5, of an energy-absorbing structure illustrating a second embodiment.
Figure 8:
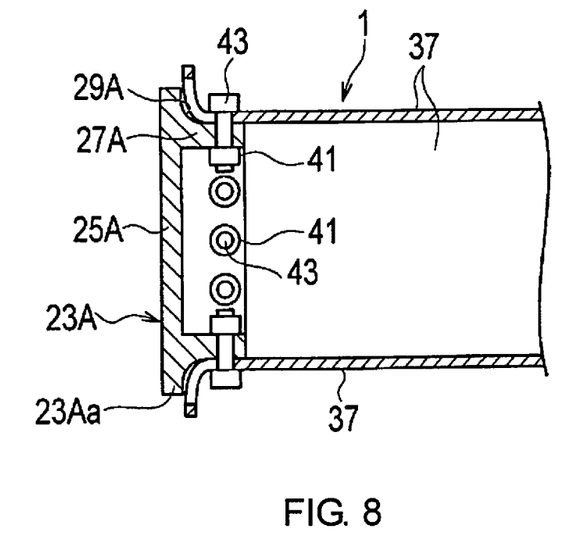
FIG. 8 is an operation explanatory view illustrating an initial state in which the energy-absorbing member is crushed and deformed with respect to FIG. 7.

FIGS. 7 and 8 illustrate a second embodiment of the present invention. In the second embodiment, the shape of the connecting member 23A is different from the connecting members 23 of the first embodiment, as illustrated in FIG. 7. The other configurations such as the energy-absorbing members 1 are the same as those of the first embodiment, and the same components have been assigned the same reference symbols, and detailed descriptions thereof have been omitted.

In the connecting member 23A, the side wall portions 27A are positioned farther inward than the outer peripheral edge of the end surface portion 25A. Thus, the end surface portion 25A has a projecting portion 23Aa whose outer peripheral edge projects outwardly with respect to the side wall portions 27A over the entire perimeter. The outer side of the bent portion between the side wall portions 27A and the projecting portion 23Aa forms a concave curved surface portion 29A over the entire perimeter. In FIGS. 7 and 8, stud bolts 33 that are similar to those of the connecting member 23 in FIG. 3 are omitted.

By positioning the side wall portions 27A farther inward than the outer peripheral edge of the end surface portion 25A, the quadrangular side wall portions 27A will be inserted inside the energy-absorbing member 1. That is, unlike the first embodiment, in the present embodiment, the side wall portions 27A of the connecting member 23A are overlapped by the side surfaces 37 of the energy-absorbing member 1 from the outside adjacent the front-end portion to form an overlapping portion 39A.

At this time the curved surface portion 29A of the connecting member 23A is positioned in front of the peripheral front end 1a of the energy-absorbing member 1, and the peripheral front end 1a and the curved surface portion 29A face each other. The curved surface portion 29A has a cross section in the form of a quarter arc of a circle. The inner surface of the side surfaces 37 of the energy-absorbing member 1 is essentially positioned on a line tangent to the end portion of the arc.

Bolt insertion holes 27Aa are formed to pass through the side wall portions 27A of the connecting member 23A, corresponding to the bolt insertion holes 37a of the energy-absorbing member 1. Nuts 41 are fixed on the inner sides of the periphery of the bolt insertion holes 27Aa. The connecting member 23A and the energy-absorbing member 1 are fixed by inserting bolts 43 into the bolt insertion holes 37a, 27Aa and fastening the nuts 41 on the bolts.

In the second embodiment as well, the impact load that is received by the bumper reinforcement 17 is transmitted to the energy-absorbing member 1 via the connecting member 23A in the state shown in FIG. 7. At that time, the energy-absorbing member 1 is crushed and deformed between the bumper reinforcement 17 and the front side members 3 to absorb the impact.

When the energy-absorbing member 1 is crushed and deformed, the impact load is input to the energy-absorbing member 1 via the fastening portion configured by the bolts 43 of the overlapping portion 39A. The shaft portions 43a of the bolts 43 are inserted into the bolt insertion holes 27Aa, 37a. Thus, the shaft portion 43a of the bolt 43 concentrates the stress in the bolt insertion hole 37a and becomes the point of origin when the energy-absorbing member 1 is crushed.

Because in the second embodiment, a plurality of bolts 43 are also provided in the same positions as in the first embodiment, as in FIG. 4, the impact load that is imparted to a bolt insertion hole 37a reaches the side surface 37 of the energy-absorbing member 1 for each of the plurality of bolt insertion holes 37a, as indicated by the arrows P. The energy-absorbing member 1 is crushed so as to be torn into multiple pieces along the load input direction with the bolt insertion holes 37a as the points of origin, due to the impact load that is imparted to each of the plurality of bolt insertion holes 37a. That is, the shaft portion 43a of the bolt 43 functions as a tearing element that tears the energy-absorbing member 1.

At this time, in the second embodiment, the energy-absorbing member 1 is positioned on the outer side of the side wall portions 27A of the connecting member 23A. Thus, the connecting member 23A moves in the direction toward the front side members 3 and transitions from the state before the impact load is received, as shown in FIG. 7 to the state shown in FIG. 8, thereby crushing the energy-absorbing member 1. At this time, the energy-absorbing member 1 efficiently absorbs the impact by the outward displacement of the peripheral front end 1a while being guided by the curved surface portion 29A of the connecting member 23A over the entire perimeter.

In the second embodiment as well, in the energy-absorbing member 1, reinforcing fibers 47 indicated by the chain double-dashed lines are arranged in a direction that intersects the load input direction, which is essentially the same direction as that indicated by the arrows P, at, for example, an approximately 45° angle, as illustrated in FIG. 4. In this case, when the energy-absorbing member 1 is torn by the bolts 43 and absorbs the impact load, the reinforcing fibers 47 are also severed, thereby absorbing the impact load. As a result, the energy absorption efficiency of the energy-absorbing member 1 is increased.

Figure 9:
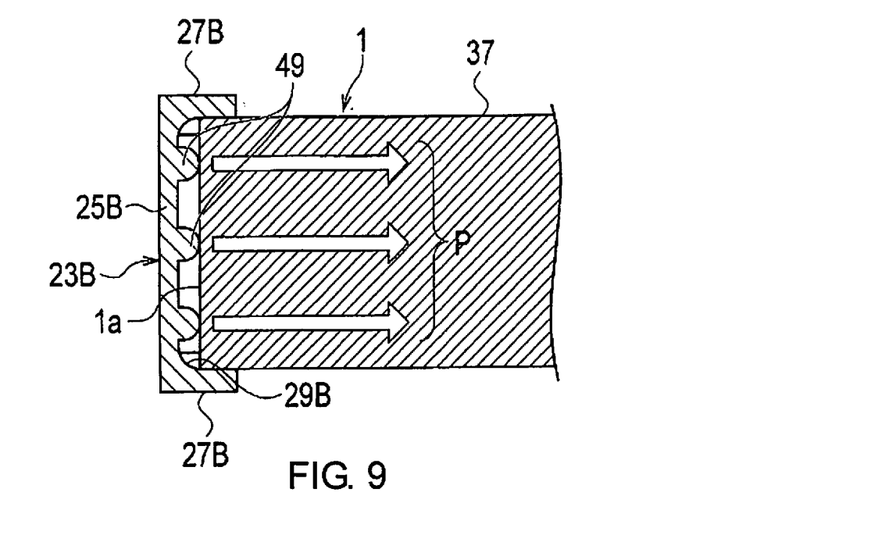
FIG. 9 is a cross-sectional view of a state in which an energy-absorbing member is connected to a connecting member, illustrating a third embodiment.
Figure 10:
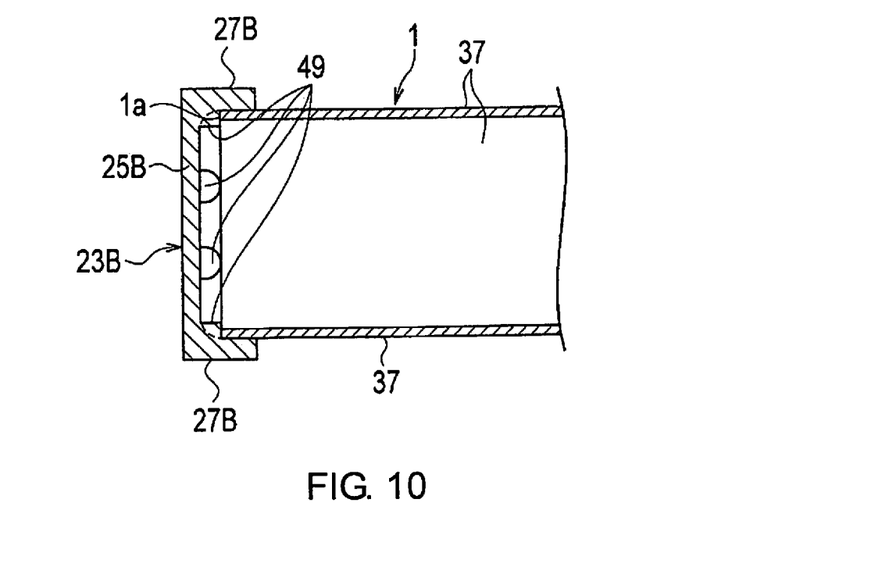
FIG. 10 is a cross-sectional view of the energy-absorbing member and the connecting member at a position rotated 90°, with the load input direction as the axis, with respect to FIG. 9.

FIGS. 9-11 illustrate a third embodiment of the present invention. In the third embodiment, the shape of the connecting member 23B is different from the connecting member 23 of the first embodiment. The other configurations such as the energy-absorbing member 1 are the same as those of the first embodiment, and the same components have been assigned the same reference symbols, and the detailed descriptions thereof have been omitted.

The connecting member 23B is provided with a plurality of projections 49 as a tearing element that projects toward the energy-absorbing member 1 on the inner side of the end surface portion 25B. The distal ends of the projections 49 have curved convex surfaces. Bolt insertion holes are not provided on the side wall portions 27B. In FIGS. 9-11, stud bolts 33 that are similar to those of the connecting member 23 in FIG. 3 are omitted.

The projections 49 are positioned at the inner corners between the end surface portion 25B and the side wall portions 27B, and the distal ends of the curved convex surfaces described above abut the peripheral front end 1a of the energy-absorbing member 1. The projections 49 are provided at two or three locations on one side surface 37 of the energy-absorbing member 1. The circumferential positions of the plurality of projections 49 with respect to the energy-absorbing member 1 are essentially the same as the positions of the plurality of bolt insertion holes 37a of the first embodiment.

In the state in which the front-end portion of the energy-absorbing member 1 is inserted into the inner side of the side wall portions 27B of the connecting member 23B, the peripheral front end 1a abuts the projections 49, and the outer circumferential surface is essentially in close contact with the inner surfaces of the side wall portions 27B. In this state, the side wall portions 27B and the energy-absorbing member 1 are bonded and fixed by using, for example, an adhesive.

In the third embodiment the projections 49 act as a tearing element instead of the bolts 43 in the first and second embodiments. Thus, the impact load that is received by the connecting member 23B will be in a state in which stress is concentrated at the peripheral front end 1a due to the plurality of projections 49, as illustrated in FIG. 11. Thus, the impact load reaches the side surfaces 37 of the energy-absorbing member 1 for each of the plurality of projections 49, as indicated by the arrows P. As a result, the energy-absorbing member 1 is torn into multiple pieces along the load input direction with the projections 49 as the points of origin. That is, the projections 49 function as a tearing element that tears the energy-absorbing member 1.

At this time the connecting member 23B moves in the direction toward the front side members 3 and transitions from the state before the impact load is received shown in FIG. 9, so as to crush the energy-absorbing member 1. At this time, the energy-absorbing member 1 absorbs the impact by being inwardly displaced as it tears.

In the third embodiment as well, in the energy-absorbing member 1, reinforcing fibers 47 indicated by the chain double-dashed lines are arranged in a direction that intersects the load input direction, which is essentially the same direction as that indicated by the arrows P, at an approximately 45° angle, for example, as illustrated in FIG. 11. In this case, when the energy-absorbing member 1 is torn by the projections 49 and absorbs the impact load, the reinforcing fibers 47 are also severed, thereby absorbing the impact load. As a result, the energy absorption efficiency of the energy-absorbing member 1 is increased.

In addition, in the third embodiment, as in the first embodiment, the side wall portions 27B of the connecting member 23B are attached so as to cover the outer perimeter side of the energy-absorbing member 1. Thus, the energy-absorbing member 1 is crushed essentially uniformly over the entire perimeter between the connecting member 23B and the energy-absorbing member, by being displaced inwardly so as to be enveloped by the side wall portions 27B from the outer side at the time of collapse, further enhancing the energy absorption efficiency. Furthermore, it is possible to prevent scattering to the outside by the inward displacement and crushing of the energy-absorbing member 1.

In the third embodiment, projections 49 that are integral with the connecting member 23B are provided as the tearing element, instead of the bolts 43 that are used in the first and second embodiments. Thus, numerous bolts 43, etc., become unnecessary, which correspondingly reduces the parts count and improves the assembly workability. Although the connecting member 23B and the energy-absorbing member 1 are fixed by means of an adhesive, for example, four appropriate peripheral locations may be fixed using bolts and nuts.

The third embodiment may also be configured such that the side wall portions 27B of the connecting member 23B are inserted into the inner side of the energy-absorbing member 1, in the same manner as shown in FIG. 7 of the second embodiment. In this case, projections that abut the peripheral front end 1a are provided in a portion corresponding to the projecting portions 23Aa of FIG. 7, in front of the peripheral front end 1a of the energy-absorbing member 1.

Embodiments of the present invention were described above, but these embodiments are described in order to facilitate comprehension of the present invention, and the present invention is not limited to the embodiments described. The technical scope of the present invention is not limited to the specific technical matters disclosed in the above-described embodiment and includes various modifications, changes, and alternatives that can be easily derived therefrom.

For example, in the embodiments described above, examples were shown in which an energy-absorbing structure including an energy-absorbing member 1 is provided in the front of the vehicle body, but a similar effect can also be achieved by providing the energy-absorbing structure in the rear of the vehicle body.

In the embodiments described above, the tearing element, constituted by the bolts 43 in the first and second embodiments or the projections 49 in the third embodiment, is provided on the bumper reinforcement 17 side of the energy-absorbing member 1. Alternatively, the tearing element can be provided on the side of the energy-absorbing member 1 adjacent the front side members 3 (see FIG. 12), or provided on both the side of the bumper reinforcement 17 and the side of the front side members 3 (see FIG. 13).

Figure 12:
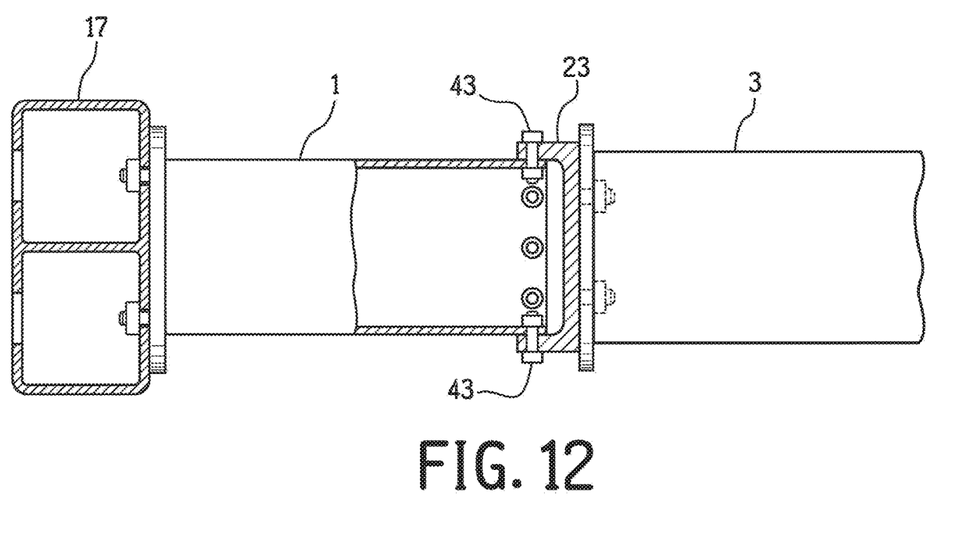
FIG. 12 is a side view of a front portion of the vehicle body with the energy absorbing structure according to an alternative embodiment shown in a partial cross section.

In the case of providing the tearing element only on the side of the front side members 3 of the energy-absorbing member 1, the front and rear of the energy-absorbing member 1 shown in FIGS. 2 and 3 are reversed, and the rear end flange if is fixed on the rear surface of the bumper reinforcement 17 to obtain the arrangement shown in FIG. 12. In the connecting member 23, the stud bolts 33 are set in positions corresponding to the bolts 19 in FIG. 2 and made to abut the front-end flange 3f of the front side members 3, and the nuts 21 are fastened to the stud bolts 33.

Figure 13:
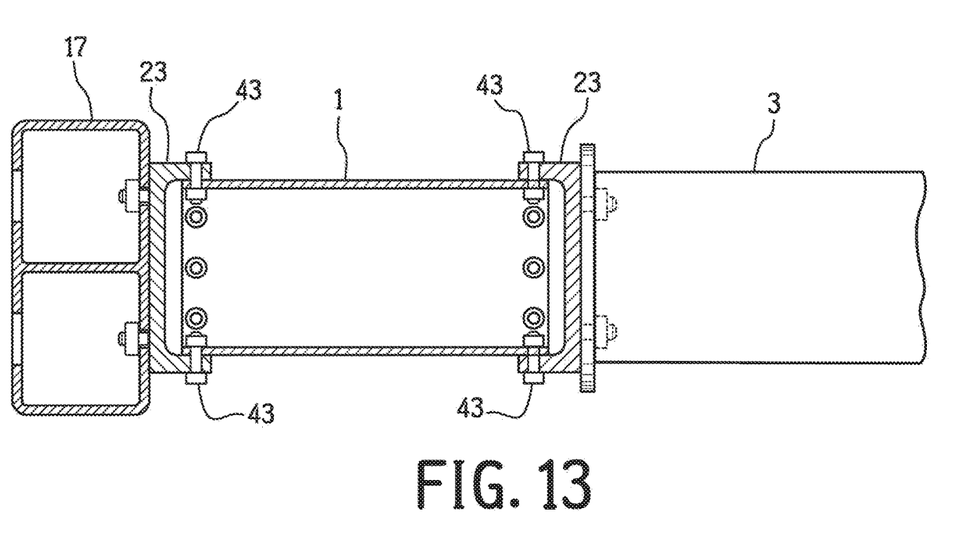
FIG. 13 is a side view of a front portion of the vehicle body with the energy absorbing structure according to another alternative embodiment shown in a cross section.

In the case of providing the tearing element on both the bumper reinforcement 17 side and the front side members 3 side of the energy-absorbing member 1, the energy-absorbing member 1 is not provided with the rear end flange if as shown in FIGS. 2 and 3, and the shapes of both the front and rear end portions are made the same. In this case, as shown in FIG. 13, the attachment structure of the rear end portion of the energy-absorbing member 1 with respect to the front side members 3 is the same as when the tearing element described above is only provided on the side of the front side members 3 of the energy-absorbing member 1.

In the embodiments described above, the energy-absorbing member 1 is configured to have the form of a quadrangular prism tube, but the shape may be a polygonal shape or a columnar tube shape, other than the form of a quadrangular prism. In this case, the shapes of the connecting members 23, 23A, 23B are similarly changed in accordance with the shape of the energy-absorbing member 1.

In the energy-absorbing member 1 of the embodiments described above, examples were shown in which reinforcing fibers 47 are arranged in a direction that intersects the load input direction, at an angle of approximately 45°, which is essentially the same direction as that indicated by the arrows P, as illustrated in FIGS. 4 and 11. However, the angle of intersection is not limited to 45°. The reinforcing fibers 47 may intersect the load input direction at a 90° angle, for example. In other words, the reinforcing fibers 47 need only intersect the load input direction in essentially the same direction as that indicated by the arrows P. Because the reinforcing fibers 47 cross the load input direction, the reinforcing fibers are severed by the tearing element.

Also, the first embodiment, which employs bolts 43, and the third embodiment, which employs projections 49, can be combined. In this case, for example, by shifting the positions along the perimeter direction, such as alternately arranging the bolts 43 and the projections 49 along the perimeter direction, the bolts 43 and the projections 49 are prevented from overlapping along the load input direction. The bolts 43 in the second embodiment shown in FIG. 7 and the projections that are provided in front of the peripheral front end 1a of the energy-absorbing member 1 can be combined as well.

The present invention is applied to an energy-absorbing structure that uses an energy-absorbing member made of fiber-reinforced resin.

The invention claimed is:
1. An energy-absorbing structure comprising:
a frame member forming a part of a vehicle body framework;
an energy-absorbing member formed from fiber-reinforced resin and provided at an end portion of the frame member;
a load-receiving member provided on the energy-absorbing member on a side opposite of the frame member;
at least one connecting member arranged in at least one of a position between the energy-absorbing member and the load-receiving member and a position between the energy-absorbing member and the frame member; and
a tearing element provided adjacent an end portion of the energy-absorbing member that corresponds to the connecting member so as to tear the energy-absorbing member upon an impact load being inputted from the load-receiving member toward the energy-absorbing member,
the fiber-reinforced resin including reinforcing fibers that extend in a direction intersecting an input direction of the impact load in the energy-absorbing member, and that are severed by the tearing element upon the energy-absorbing member being torn,
the connecting member and the energy-absorbing member overlapping in a direction that intersects with the input direction of the impact load to form an overlapping portion,
the overlapping portion having a mounting hole that extends in a direction of the overlap, and
the tearing element includes a fastener inserted into the mounting hole.

2. The energy-absorbing structure as recited in claim 1, wherein
the energy-absorbing member has a tubular shape, and
connecting member is attached to overlie an outer perimeter side of the tubular shape of the energy-absorbing member to form the overlapping portion.

3. The energy-absorbing structure as recited in claim 1, wherein
connecting member includes a portion having a curved concave surface that opposes the end portion of the energy-absorbing member on which the tearing element is provided.

4. The energy-absorbing structure recited in claim 1, wherein
the energy-absorbing member has a prismatic tubular shape, and
the tearing element is disposed in a position that corresponds to a surface portion of the prismatic tubular shape.

5. The energy-absorbing structure as recited in claim 1, wherein
the energy-absorbing member has a tubular shape, and
the connecting member is attached to overlie an inner perimeter side of the tubular shape of the energy-absorbing member to form the overlapping portion.

6. The energy-absorbing structure as recited in claim 1, wherein
the at least one connecting member includes a connecting member arranged in the position between the energy-absorbing member and the load-receiving member.

7. The energy-absorbing structure as recited in claim 6, wherein
the at least one connecting member further includes another connecting member arranged in the position between the energy-absorbing member and the frame member, and
another tearing member is provided with respect to the other connecting member.

8. The energy-absorbing structure as recited in claim 1, wherein
the at least one connecting member includes a connecting member arranged in the position between the energy-absorbing member and the frame member.

\* \* \* \* \*